United States Patent [19]

Shibanai et al.

[11] Patent Number: 4,711,936

[45] Date of Patent: Dec. 8, 1987

[54] CURING AGENT FOR EPOXY RESIN AND METHOD FOR CURING EPOXY RESIN

[75] Inventors: Ichiro Shibanai, Tokyo; Kenji Nakamura, Osaka, both of Japan

[73] Assignee: Japan Liquid Crystal Co., Ltd., Tokyo, Japan

[21] Appl. No.: 803,289

[22] PCT Filed: Mar. 19, 1985

[86] PCT No.: PCT/JP85/00135

§ 371 Date: Nov. 13, 1985

§ 102(e) Date: Nov. 13, 1985

[87] PCT Pub. No.: WO85/04411

PCT Pub. Date: Oct. 10, 1985

[30] Foreign Application Priority Data

Mar. 27, 1984 [JP] Japan .................. 59-57462

[51] Int. Cl.$^4$ ............................. C08G 59/68
[52] U.S. Cl. .................... 525/485; 536/103; 525/511; 528/48; 528/88; 528/365; 528/407
[58] Field of Search ............... 527/300, 303; 528/88, 528/110, 48, 365, 407; 536/103; 525/485, 511

[56] References Cited

U.S. PATENT DOCUMENTS

| | | | |
|---|---|---|---|
| 3,420,788 | 1/1969 | Solms | 260/17.4 |
| 4,228,160 | 10/1980 | Szejtli et al. | 536/103 X |
| 4,365,061 | 12/1982 | Szejtli et al. | 536/103 |
| 4,380,626 | 4/1983 | Szejtli et al. | 536/103 |
| 4,518,588 | 5/1985 | Szejtli et al. | 536/103 X |
| 4,575,548 | 3/1986 | Ueda et al. | 536/103 X |

*Primary Examiner*—Earl Nielsen
*Attorney, Agent, or Firm*—Jordan and Hamburg

[57] ABSTRACT

A curing agent for an epoxy resin comprises a cyclodextrin clathrate compound of a compound which is reactive with an epoxy group, a curing agent for an epoxy resin comprising a mixture of a cyclodextrin clathrate compound of a compound which is reactive with an epoxy group with a trace amount of amylase, and methods for the preparation of these curing agents. The curing agents are stable at room temperature, and the curing reaction is initiated under remarkably simple conditions.

7 Claims, No Drawings

CURING AGENT FOR EPOXY RESIN AND METHOD FOR CURING EPOXY RESIN

BACKGROUND OF THE INVENTION

The present invention relates to a curing agent for an epoxy resin, which is chemically stable at room temperature, prepared by forming a cyclodextrin clathrate compound of a compound which is reactive with an epoxy group, and a method for curing an epoxy resin using said curing agent.

An epoxy resin which is liquid or thermoplastic at room temperature can be converted into a thermosetting solid by reaction with a compound which is reactive with an epoxy group (a curing agent for an epoxy resin). Curing of an epoxy resin for applications is therefore effected in such a manner that an uncured epoxy resin and a curing agent are separately stored until they are mixed at the time of application.

Primary and secondary amines, amine complex compounds, organic acids and anhydrides thereof, alcohols, phenols, and the like have been used conventionally as the curing agent for an epoxy resin. These curing agents have, however, disadvantages from the viewpoints of treatment or operation because many of them are chemically unstable, volatile, highly toxic to human bodies, or difficult to homogeneously mix or disperse in an epoxy resin (see Japanese Patent Publications No. 9838/1975, No. 27760/1978, and No. 47837/1975).

SUMMARY OF THE INVENTION

The present invention has been developed with the aim of providing a curing agent for an epoxy resin, which is chemically stable at room temperature, prepared by forming a cyclodextrin clathrate compound of a compound which is reactive with an epoxy group; a method for curing an epoxy resin by incorporating and dispersing said curing agent in an epoxy resin and heating the mixture at a temperature of 90° C. or higher, whereby said cyclodextrin clathrate compound is decomposed and the curing reaction of the epoxy resin is initiated a curing agent for an epoxy resin obtained by adding a trace amount of amylase to the curing agent for an epoxy resin described above; and a method for curing an epoxy resin by heating said curing agent at a temperature of 30° C. or higher, whereby cyclodextrin is decomposed by said amylase and the curing reaction of the epoxy resin is initiated.

DETAILED DESCRIPTION OF THE PREFERRED EMBODIMENTS

Examples of the substances which are reactive with an epoxy resin are listed below.

[1] Organic polyamine
  (a) Ethylenediamine $H_2N-CH_2-CH_2-NH_2$ (b) Diethylenetriamine $H_2N-CH_2-CH_2-NH-CH_2-CH_2-NH_2$ (c) Diethylaminopropylamine

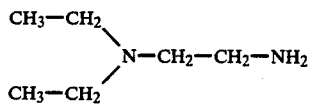

(d) N-aminoethylpiperazine

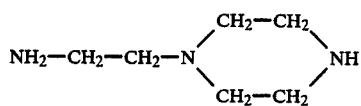

[2] Internal amine adduct, Separated adduct
  (a) Amine adduct

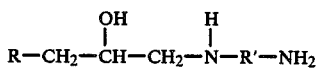

(b) Amine ethyleneoxide adduct

(c) Cyanoethyl compound

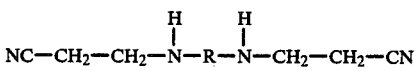

[3] Polyamide resin

[4] Aromatic amine
  (a) Metaphenylenediamine

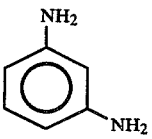

(b) Diaminodiphenylmethane

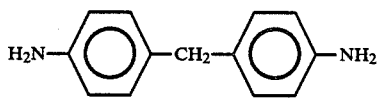

(c) Diaminodiphenylsulfone

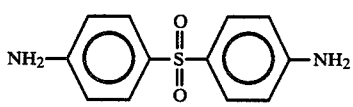

[5] Amine precondensation compound Etpoxy amine adduct

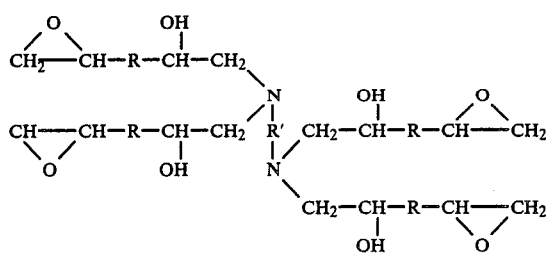

[6] Amine complex
  (a) Dicyanodiamide

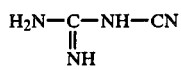

(b) Heterocyclic amine

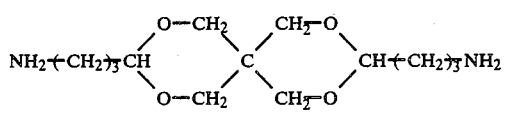

(c) Xylylenediamine

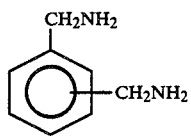

(d) Piperazine
  (e) Pyridine
  (f) Imidazole
  (g) N-aminoethylpiperazine
  (h) Menthanediamine

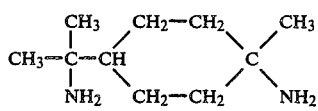

(i) Trimethylamine

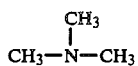

(j) Benzyldimethylamine

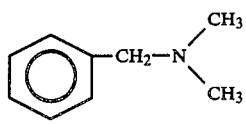

(k) α-methylbenzyldimethylamine

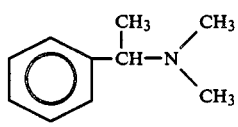

(l) Dimethylaminomethylphenol

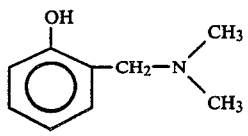

(m) Tridimethylaminomethylphenol

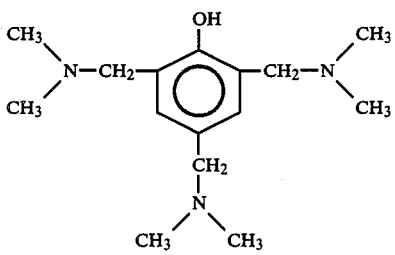

[7] Amine salt, Amine complex salt
  (a) Tridimethylaminomethylphenol-tri-2-ethylhexanoate

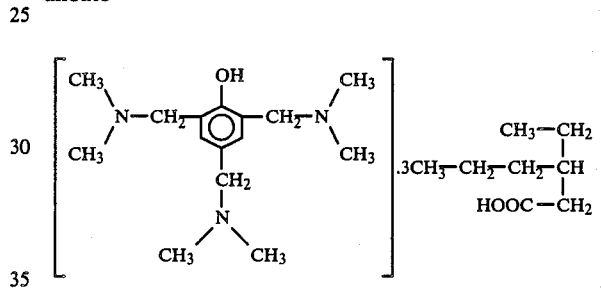

(b) Borontrifluoridemonoethylamine complex

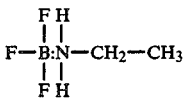

(c) Borontrifluoride·amine complex salt

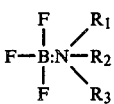

[8] Organic acid, Organic acid anhydride
  (a) Phthalic anhydride

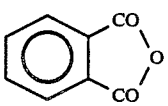

(b) Hexahydrophthalic anhydride

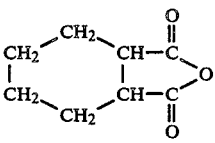

(c) Maleic anhydride

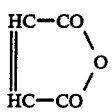

(d) Pyromellitic dianhydride

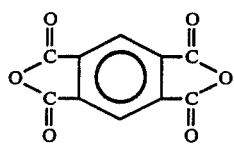

(e) Benzophenonetetracarboxylic dianhydride

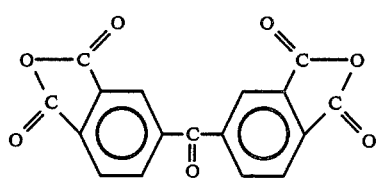

(f) Methylnadic anhydride

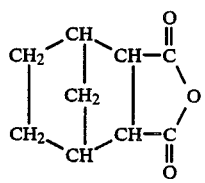

(g) Dodecysuccinic anhydride

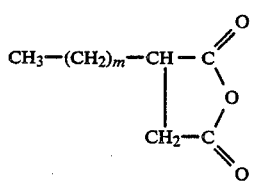

(h) Chlorendic anhydride

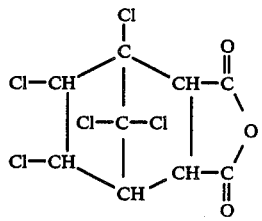

(i) Dichloromaleic anhydride

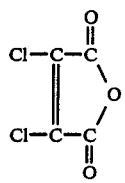

[9] Precondensation of organic anhydride

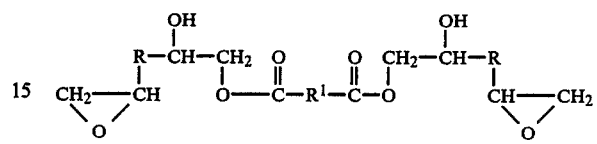

[10] Urea resin
[11] Melamine resin
[12] Aniline-formaldehyde resin

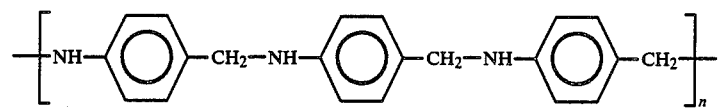

[13] Polyhydric phenol
  (a) Bisphenol A

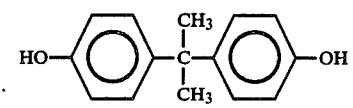

(b) Trimethylolaryloxyphenol

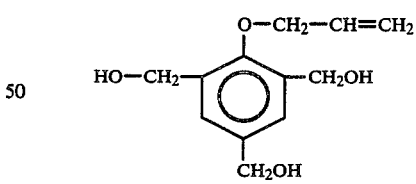

[14] Phenol resin

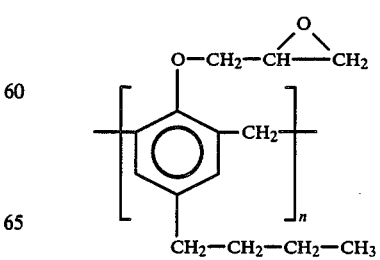

[15] Epoxydibutylphenol resin

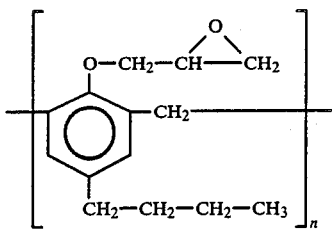

[16] Epoxy resin ester
[17] Modified rosin ester

[18] Styrenated epoxy resin ester
[19] Epoxy resin modified alkyd resin
[20] Isocyanate compound
[21] Fran resin
[22] Polyester resin
[23] Silicone resin
[24] Polysulfide resin

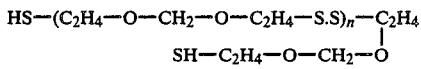

[25] Epoxy resin modified coal tar
[26] Keto imine as special catalyzer

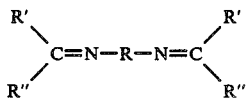

Cyclodextrin (hereinafter referred to as CD) which can be used in the present invention includes α, β, and γ-cyclodextrin, among which β-type is the most suitable.

The cyclodextrin clathrate compound of a compound which is reactive with an epoxy group (a curing agent for an epoxy resin) of the present invention is prepared by mixing an aqueous solution of CD with the compound which is reactive with an epoxy group to form a clathrate compound, and the obtained clathrate compound is usually dried and used in the form of powder.

When the present curing agent is incorporated and dispersed in an epoxy resin, the removal of CD from the clathrate compound and the re-production of the compound which is reactive with an epoxy resin can be effected by heating the mixture at a temperature of 90° C. or higher.

Since the CD used in the present invention comprises glucose cyclized through an α-1,4 linkage, if amylase (dextrin-decomposing enzyme) has been preliminarily added to the clathrate compound, the CD can be decomposed and the compound which is reactive with an epoxy resin can be liberated by maintaining the mixture at a temperature at which amylase is active (e.g. at 40° C.).

The following examples are illustrative but not limitative of the invention:

EXAMPLE 1

A coating liquid comprising a mixture of 16 parts of a cyclodextrin clathrate compound of diethylenetriamine of 25% purity, 49 parts of 3-bisphenol A glycidyl ether diepoxide (Epicoat 1001, manufactured by Shell Chemical Co., Ltd.) having the structural formula:

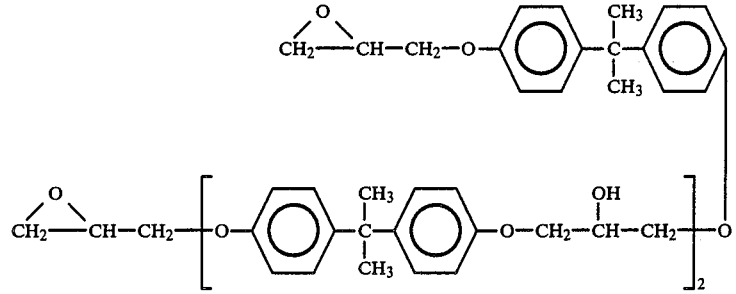

30 parts of methyl ethyl ketone, 30 parts of methyl isobutyl ketone, and 50 parts of toluene was applied to a bonded steel plate, heated at 130° C. for 5 minutes, and left to stand at room temperature for 3 days.

The toxicity caused by the gasification of diethylenetriamine is largely reduced in this coating liquid. Moreover, the coating can be operated safely because volatilization is controlled.

Conventional epoxy resins have been used mostly as a two-pack formulation comprising an epoxy resin and a curing agent, which has involved difficulties in that the application is inhibited by an increase in viscosity with time, due to the initiation of the curing reaction immediately after mixing, and that a large amount of loss (on curing) is produced. These disadvantages have been completely overcome by the present invention, that is, the coating liquid can be stored or used as a one-pack type because the reaction is not initiated until the membrane of CD is broken by heat-treatment.

EXAMPLE 2

A casting liquid comprising a mixture of 80 parts of a cyclodextrin clathrate compound of phthalic anhydride of 30% purity, 80 parts of 2-bisphenol A glycidyl ether diepoxide having the structural formula:

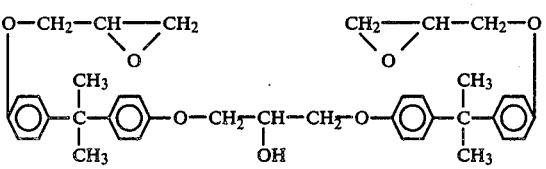

(Epicoat 834, manufactured by Shell Chemical Co., Ltd.), 10 parts of Epicoat 1001, and 8 parts of silicon dioxide (Siloid 244, manufactured by Fuji Devison Co., Ltd.) was applied to a printing plate for an electric circuit, heated at 130° C. for 30 minutes, and left to stand at room temperature for 2 days, whereby the application liquid was cured.

Since the amount of phthalic anhydride evaporating from said application liquid could be reduced, the curing could be effected stably, resulting in homogeneity in curing, unlike the conventional curing agents.

EXAMPLE 3

An adhesive for flocking was prepared by incorporating 5 parts of a cyclodextrin clathrate compound of diaminopropylamine (25% purity) with 100 parts of a polyacrylic acid ester emulsion (Dicnal #1571, manufactured by Dainippon Ink and Chemicals, Co., Ltd.) and 5 parts of 4- glycidyl ether diepoxide (Epon 812, manufactured by Shell Chemical Co., Ltd.), whereto 1 to 2 parts of ammonia was further added, and the mixture was stirred.

The adhesive was applied to a 6 mm thick urethane foam sheet in an amount of 150 g/m², onto which nylon pile (1.0 d, 0.7 mm) was statically flocked, dried at 105° C. for decomposition of the clathrate compound, and heat-crosslinked at 110° C. for 5 minutes, whereby a flocked sheet for the manufacture of cosmetic puffs was obtained.

The adhesive was stable at room temperature, and never solidified even after being left to stand at room temperature for 3 days, unlike conventional adhesives containing no clathrate compounds. The adhesive was also excellent in oil resistance and waterproofness, so it could be cured at a relatively low temperature.

EXAMPLE 4

An application liquid comprising a mixture of 100 parts of bisphenol A diepoxide having the structural formula:

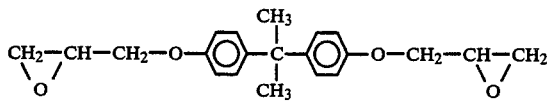

(Epicoat 828, manufactured by Shell Chemical Co., Ltd.), 50 parts of a cyclodextrin clathrate compound of m-phenylenediamine (30% purity), and 10 parts of titanium white was applied on a male molding die for a protective helmet, on which a mold-release agent had been preliminarily applied. Glass fiber fabric was laminated on it, and the application liquid was further applied thereon twice. A female molding die for a protective helmet, the inside of which had been subjected to mold-release treatment, was placed on it, and the mold contents were pressed and heated at 120° C. for 2 hours for curing. After the curing was completed, the dies were removed, and a protective helmet was obtained.

Since the vapor of m-phenylenediamine was substantially eliminated from the application liquid, the liquid was substantially non-toxic, which improved the operating circumstances.

EXAMPLE 5

An application liquid comprising a mixture of 100 parts of Epicoat 1001 (manufactured by Shell Chemical Co., Ltd.), 140 parts of a cyclodextrin clathrate compound of chlorendic anhydride (30% purity) and 110 parts of methyl ethyl ketone was applied to the both surfaces of a glass fiber fabric which had been preliminarily impregnated with a 0.5% aqueous solution of aminosilanol (Toray Silicone SH-6020), drawn by 40%, dried, heat-treated at 140° C. for 10 minutes, and dried at a temperature not higher than 100° C. A lamination of three sheets of this glass fiber fabric was heat-pressed by a mold-release-treated hot plate at 160° C. for 10 minutes, whereby a glass fiber laminate for a printed circuit was obtained.

The serviceable life of this application liquid was more than 10 times that of a liquid containing no clathrate compounds.

What is claimed is:

1. A curing agent for an epoxy resin, comprising a mixture of a cyclodextrin clathrate compound of an organic compound reactive with an epoxy group, and a trace amount of amylase.

2. A curing agent for an epoxy resin, comprising a cyclodextrin clathrate compound of an organic compound reactive with an epoxy group, said organic compound being selected from the group consisting of a polyamide resin, an aromatic amine, an amine precondensation compound, an amine complex, an amine salt, an amine complex salt, an organic acid anhydride, an organic anhydride precondensate, a urea resin, a melamine resin, an aniline-formaldehyde resin, a polyhydric phenol, a phenol resin, an epoxydibutylphenol resin, an epoxy resin ester, a modified rosin ester, a styrenated epoxy resin ester, an isocyanate compound, a silicone resin, a polysulfide resin, and a keto imine special catalyzer.

3. A curing agent as set forth in claim 1, wherein said organic compound is selected from the group consisting of an organic polyamine, a polyamide resin, an aromatic amine, an amine precondensation compound, an amine complex, an amine salt, an amine complex salt, an organic acid anhydride, an organic anhydride precondensate, a urea resin, a melamine resin, an aniline-formaldehyde resin, a polyhydric phenol, a phenol resin, an epoxydibutylphenol resin, an epoxy resin ester, a modified rosin ester, a styrenated epoxy resin ester, an isocyanate compound, a silicone resin, a polysulfide resin, and a keto imine special catalyzer.

4. A method for curing an epoxy resin, which comprises heating a mixture obtained by incorporating and dispersing the following Component (B) in the Component (A) at a temperature of 90° C. or higher:
    Component (A): a high-molecular compound containing an epoxy group, and
    Component (B): a cyclodextrin clathrate compound of a compound which is reactive with an epoxy group.

5. A method for curing an epoxy resin, which comprises heating a mixture obtained by incorporating and dispersing the following Component (B) in the Component (A) at a temperature of 30° C. or higher:
    Component (A): a high-molecular compound containing an epoxy group, and
    Component (B): a mixture of a cyclodextrin clathrate compound of a compound which is reactive with an epoxy group, with a trace amount of amylase.

6. A method as set forth in claim 4, wherein component (B) is a cyclodextrin clathrate compound of a compound selected from the group consisting of an organic polyamine, a polyamid resin, an aromatic amine, an amine precondensation compound, an amine complex, an amine salt, an amine complex salt, an organic acid anhydride, an organic anhydride precondensate, a urea resin, a melamine resin, an aniline-formaldehyde resin, a polyhydric phenol, a phenol resin, an epoxydibutylphenol resin, an epoxy resin ester, a modified rosin ester, a styrenated epoxy resin ester, an isocyanate compound, a silicone resin, a polysulfide resin, and a keto imine special catalyzer.

7. A method as set forth in claim 5, wherein component (B) is a cyclodextrin clathrate compound of a compound selected from the group consisting of an organic polyamine, a polyamid resin, an aromatic amine, an amine precondensation compound, an amine complex, an amine salt, an amine complex salt, an organic acid anhydride, an organic anhydride precondensate, a urea resin, a melamine resin, an aniline-formaldehyde resin, a polyhydric phenol, a phenol resin, an epoxydibutylphenol resin, an epoxy resin ester, a modified rosin ester, a styrenated epoxy resin ester, an isocyanate compound, a silicone resin, a polysulfide resin, and a keto imine special catalyzer.

* * * * *